R. K. JAYNE
RUNNING GEAR.
APPLICATION FILED AUG. 13, 1913.

1,109,926.

Patented Sept. 8, 1914.

2 SHEETS—SHEET 1.

R. K. JAYNE.
RUNNING GEAR.
APPLICATION FILED AUG. 13, 1913.

1,109,926.

Patented Sept. 8, 1914.
2 SHEETS—SHEET 2.

Witnesses
Wm. H. Mulligan
Robt. Meyer

Inventor
Robert K. Jayne,
By Richard Beuer,
his Attorney

UNITED STATES PATENT OFFICE.

ROBERT K. JAYNE, OF JACKSON, MISSISSIPPI.

RUNNING-GEAR.

1,109,926.  Specification of Letters Patent.  Patented Sept. 8, 1914.

Application filed August 13, 1913. Serial No. 784,593.

*To all whom it may concern:*

Be it known that I, ROBERT K. JAYNE, a citizen of the United States, residing at Jackson, in the county of Hinds and State of Mississippi, have invented certain new and useful Improvements in Running-Gears, of which the following is a specification.

This invention relates to vehicles and more particularly to new and useful running gears for the same.

An object of the invention is the provision of running gears for various types of vehicles, in which rollers are substituted for the ordinary wheels; thus providing a greater supporting surface which will run smoothly over rough or uneven ground and which will have a tendency to smooth and pack rather than cut in or otherwise mar the surface of the highways over which it travels as is the case with the ordinary vehicle wheel.

Another object of this invention is the provision of running gears of this nature which may be easily and conveniently turned so as to round corners or the like and one which owing to its construction will eliminate the necessity of Macadamized highways throughout the country in that the greater surface of the wheels or rollers will allow them to pass freely and smoothly over dirt roads.

A still further object of this invention is the provision of means to prevent mud or loose earth from clinging to the wheels or rollers of the vehicle.

With the foregoing and other objects in view, this invention consists in such novel features of construction, combination and arrangement of parts as will be hereinafter more fully described, illustrated in the accompanying drawings and claimed.

Figure 1:
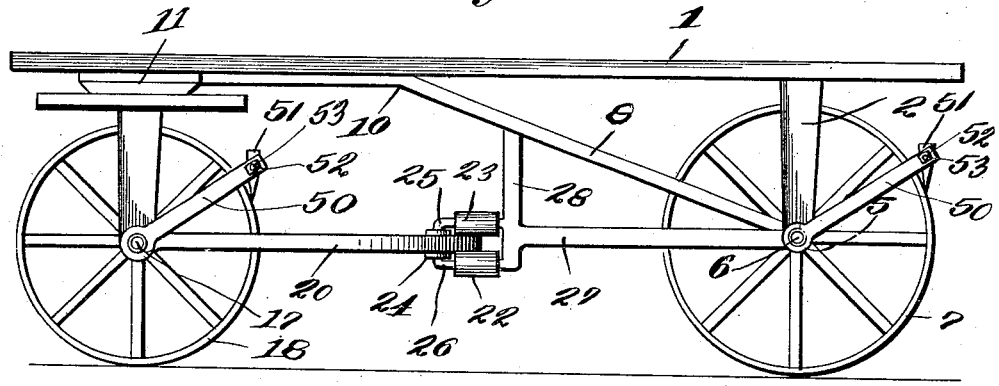
Figure 2:
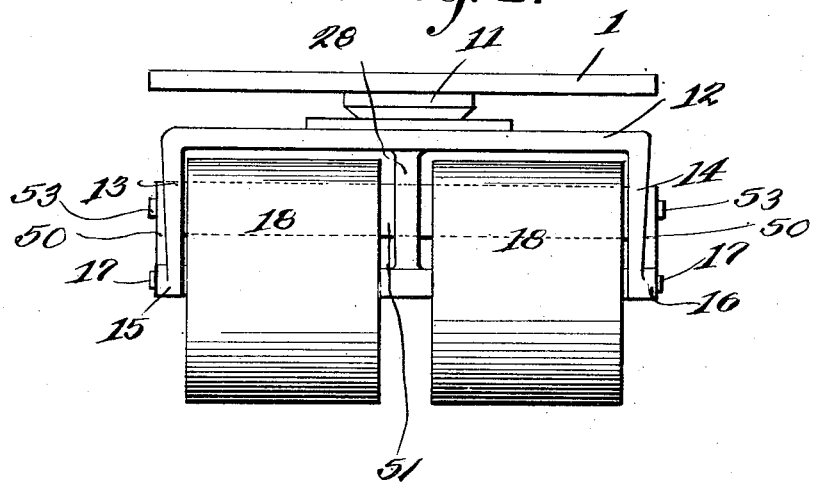
Figure 3:
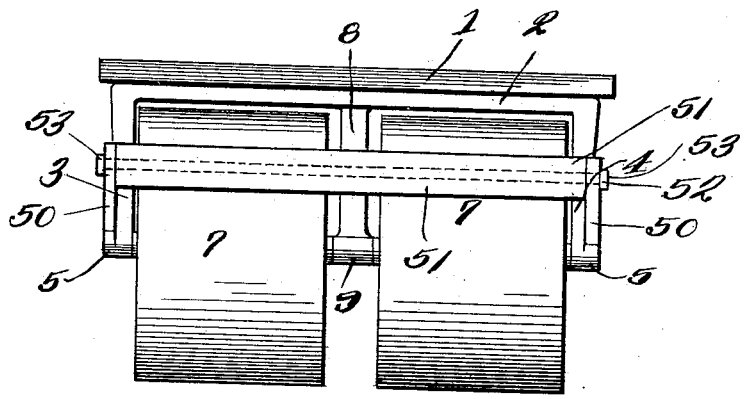
Figure 4:
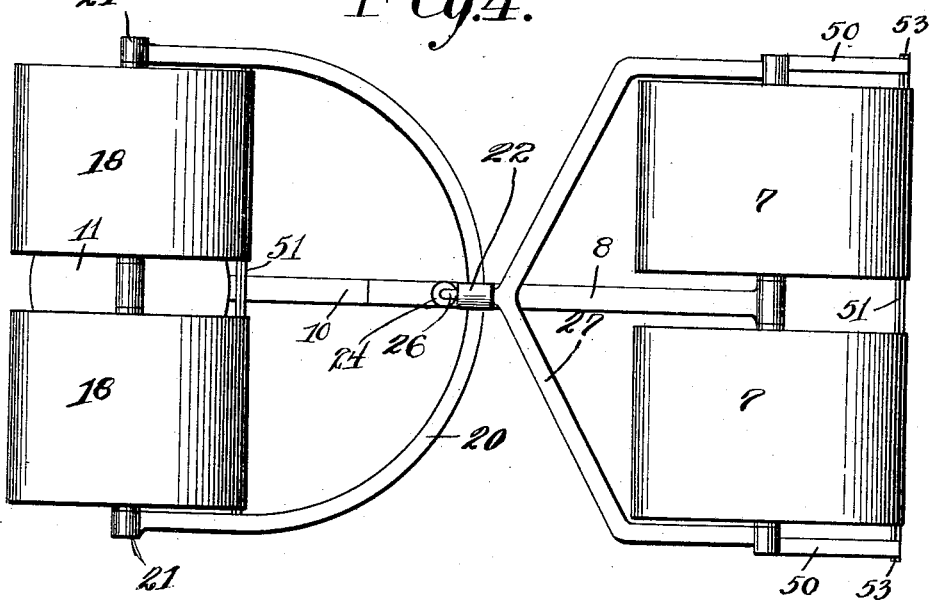

In describing this invention in detail reference will be had to the accompanying drawings wherein like characters of reference designate like or corresponding parts throughout the several views, and in which, Figure 1 is a side elevation of the improved running gear; Fig. 2 is a front view of the improved running gear; Fig. 3 is a rear view of the running gear; and Fig. 4 is an inverted plan view of the running gear with the frame removed.

Referring more particularly to the drawings 1 designates the frame of the running gears of a vehicle which is constructed in accordance with the shapes of the bodies of various types of vehicles and which has a member 2 connected to its rear end in any suitable manner. The member 2 is substantially the shape of an inverted U. The two leg portions 3 and 4 of the member 2 have bearings 5 formed upon their lower ends in which is journaled a shaft or axle 6. The shaft or axle 6 has rollers 7 mounted thereupon. In the drawings two rollers 7 are shown mounted upon the axle 6 and are also shown as spaced apart leaving a short space between their adjoining sides but should it be desired a single roller may be mounted upon the shaft 6 and extend the entire distance across the rear portion of the vehicle frame 1. A brace 8 which has a bearing 9 formed upon one end thereof extends upwardly from the rear axle 6 and is bent at 10. The portion of the member 8 extending forward from the bending point 10 is parallel with the frame 1 and abuts the under surface of the same terminating at the fifth wheel 11 of the vehicle. The rear axle 6 is journaled through the bearing 9 and the bearing 9 is disposed between the adjacent sides of the two rollers 7.

The fifth wheel 11 which is disposed upon the front portion of the vehicle frame 1 has a member 12 which is also the shape of an inverted U connected thereto. The sides 13 and 14 of the member 12 have bearings 15 and 16 formed upon their lower ends in which is journaled the front axle 17 of the vehicle. The front axle 17 has rollers 18 rotatably mounted thereupon. The rollers 18 are similar in construction to the rollers 7 and these rollers 7 and 18 are substituted for the usual type of vehicle wheel. A reach section 20 having an arcuate or semi-circular portion as shown, also has bearings 21 formed upon its ends, in which bearings the front axle 17 is journaled. The reach section member 20 is constructed of bar steel having its upper and lower surfaces as well as its inner surface straight so as to be efficiently and approximately anti-frictionally engaged by the rollers 22, 23 and 24. The rollers 22, 23 and 24 are carried by arms 25 and 26 which project outwardly from a brace frame or reach section 27. The reach section 27 is connected to the rear axle 6 in any suitable manner such as is shown in Fig. 4 of the drawings and has an upstanding brace arm 28 formed thereupon which engages the under surface of the members 8 and forms an auxiliary support for the same.

By the provision of the semicircular member 20 and the various rollers which are in engagement therewith, a vehicle running gear is provided which may be easily, quickly and conveniently turned as the member 20 and the rollers form an auxiliary fifth wheel for the running gears and enables the front portion of the running gear to be turned practically at right angles to the rear portion.

The front and rear axles 17 and 6 of the vehicle have arms 50 rigidly mounted upon their outer ends. The arms 50 extend rearwardly and upwardly from the axles and have scraper blades 51 pivotally connected thereto as at 52. The scraper blades 51 are pivotally connected to the arms 50 by means of bolts which extend through the arms 50 and which have nuts 53 mounted upon their outer ends which protrude through the arms. These nuts form means for adjusting the scraper blades 51 in that they may be loosened upon the bolts 6 permitting of the pivotal movement of the scraper blades so that the blades may be held in various adjusted positions relative to the surface of the rollers. The scraper blades 51 extend laterally across the vehicle, forming means for preventing the mud, dirt or the like from clinging to the surface of the roller. By pivotally connecting the scraper blades 51 to the arms 50 the blades may be adjusted so that they will engage the surface of the rollers or so that they will be spaced away from the rollers preventing their engagement therewith as is desired.

In practical fields certain minor features of construction, combination and arrangement of parts may necessitate alterations to which the patentee is entitled provided such alterations are comprehended within the scope of what is claimed.

What is claimed is:

1. In a vehicle running gear structure, a turnable front axle, a rear axle, traction members mounted on said axles, a substantially horizontally disposed reach section connected to the front axle, a second substantially horizontally disposed reach section, said second reach section connected to the rear axle and in supporting relation with the first reach section, a frame-brace member connected to one of said axles and extending upwardly and over the second reach section, and an upstanding support member on which said brace-member rests on said second reach section.

2. In a vehicle running gear structure, a turnable front axle, a rear axle, traction members mounted on said axles, a substantially horizontally disposed reach section connected to the front axle, said reach section having an arcuate portion for the purpose specified, a second reach section, substantially horizontally disposed, said second reach section connected to the rear axle, said second reach section having an arm extending across the first reach section, a plurality of rollers on said arm, one of said rollers engaging the inner face of the first reach section and the other of said rollers engaging the under face of the first reach section for the purpose specified.

In testimony whereof I affix my signature in presence of two witnesses.

ROBERT K. JAYNE.

Witnesses:
C. H. HEALD,
GEO. GALLE.

---

Copies of this patent may be obtained for five cents each, by addressing the "Commissioner of Patents, Washington, D. C."